United States Patent Office 3,447,669
Patented June 3, 1969

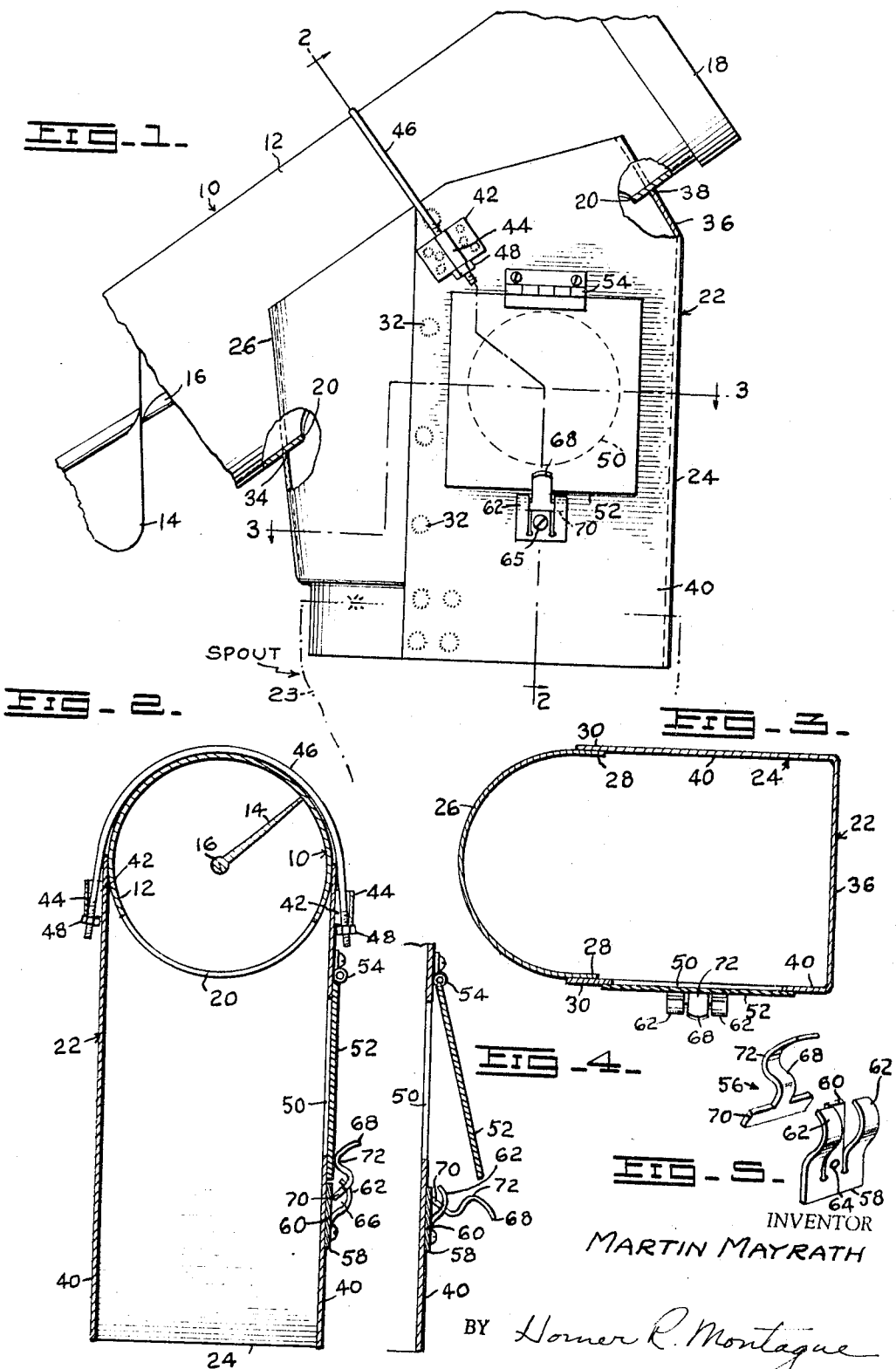

3,447,669
AUGER CONVEYOR DISCHARGE UNIT WITH SAFETY OUTLET
Martin Mayrath, 10707 Lennox Lane,
Dallas, Tex. 75229
Filed Mar. 24, 1967, Ser. No. 625,863
Int. Cl. B65g 33/14
U.S. Cl. 198—213    8 Claims

ABSTRACT OF THE DISCLOSURE

An outlet spout for an auger conveyor is provided with a normally closed gate automatically popped open by an excess accumulation of pressure in the spout due to stoppage therein, to release grain or the like therefrom to prevent damage to the auger conveyor.

Background of the invention

Inclined auger conveyors are used, for example on farms, for conveying grain upwardly and discharging it into a silo, bin, truck body or other receiving structure, or even onto the ground. The material is often discharged from the upper end of the conveyor downwardly through a spout, the lower portion of which may be rigid or flexible. In the prior art, if a bin or other receptacle became full while the conveyor was running, or even if the grain should pile up in the narrow spout, material could not be freely discharged from the lower end of the spout. This resulted in blockage of the auger resulting in the shearing of pins or otherwise damaging the auger mechanism, especially since the operator could not ordinarily tell that a stoppage had arisen.

Summary of the invention

The upper end of the conveyor discharges material into a discharge spout unit affixed to the conveyor tube and having at its lower end a rigid or flexible discharge spout portion. The upper wall portion of the unit connected to the conveyor tube has a gate normally closing a relief-discharge opening in the discharge spout unit and maintained in normal closed position by an over-center snap latch. When material accumulates in the discharge unit for the reason that the spout unit, or a bin or other receptacle to which material is being fed, has become too full or "tight," no more material can flow from the upper end of the conveyor tube into the discharge unit. Under such conditions continued operation of the auger will cause pressure to build up in the material in the discharge unit, thus forcing the relief gate open. Movement of the gate causes the snap to swing to a release position so that material can freely flow from the outlet unit, thus preventing damage to the conveyor or any mechanical parts associated therewith.

Brief description of the drawing

FIGURE 1 is a fragmentary side elevation of an auger conveyor showing attached thereto an outlet unit embodying the present invention, FIGURE 2 is a section taken substantially on line 2—2 of FIGURE 1, FIGURE 3 is a similar view taken substantially on line 3—3 of FIGURE 1, FIGURE 4 is a fragmentary sectional view corresponding to the adjacent side of FIGURE 2 showing the safety gate in partly open position, and FIGURE 5 is a perspective view of the over-center snap device, the parts being shown separated.

Description of the preferred embodiment

Referring to FIGURES 1 and 2 the numeral 10 designates an auger conveyor as a whole comprising the usual tube 12 having a power-driven conveyor auger 14 therein provided with the usual shaft 16. The upper end of the tube 12 has mounted thereon the usual cap 18 which may include a bearing (not shown) for the shaft 16. Near its upper end, the under side of tube 12 is provided with a discharge opening 20 for the flow therethrough of grain or other material conveyed from the lower end of the conveyor 10. Shaft 16 may be driven from either end, or by an intermediate drive, as well known in the art.

Beneath the opening 20 is mounted a discharge unit 22 to the bottom may be connected a conventional rigid or flexible spout 23 for discharging grain or other material into a bin, truck body or other receptacle, or onto the ground. The unit 22 is provided with a "rear" section 24 and a "forward" section 26, curved as shown in FIGURE 3 and having its edges 28 lying within the vertical edges 30 of the section 24 and spot welded thereto as at 32.

The curved wall of the section 26 is cut away at the top thereof as at 34 to fit snugly around the bottom of the tube 12, engaging therewith below the lower limit of the opening 20. The rear wall 36 of the section 22 has its upper end similarly cut away as at 38 to fit around the lower portion of the tube 12 above the upper limit of the opening 20. Thus material moved upwardly through conveyor 10 drops through the opening 20 into the discharge unit 22, from which it flows downwardly through a conventional discharge spout, to thus fall into the desired receptacle, or location.

The side walls 40 of the section 24 carry brackets 42 bent intermediate their ends to form loops 44 through which extend the ends of a clamping member 46 in the form of a U-bolt having threaded lower ends receiving nuts 48. The member 46 forms a yoke (FIGURE 2) extending around the tube 12, thus clamping the discharge unit 22 rigidly with respect to the tube 12. Additional supplementary means may be employed (not shown) for rigidly locating the unit 22 in position. Any such supplementary means (such as short pins on one portion engaged in holes in the other), forms no essential part of the present invention.

One wall 40 of the section 24 is provided with an opening 50 normally covered by an outer gate 52 hinged as at 54 to the adjacent portion of wall 40. This gate is normally maintained closed by an over-center snap device indicated as a whole by the numeral 56 and shown in perspective in FIGURE 5. This device comprises a bracket 58 having an upwardly extending center finger 60 lying flat against the adjacent wall 40, and curved fingers 62 on opposite sides of such center finger. The bracket 58 is provided with an opening 64 to receive a screw 65 for securing it to the adjacent wall 40, or it may be welded in place. The curved fingers 62 form with the adjacent wall 40 a pocket 66 for a purpose to be described.

The snap device 56 further comprises an operating element having a curved finger 68 provided at its lower end with an integral oppositely extending shank 70 mounted in the pocket 66. The finger 68 is provided intermediate its ends with a curved portion 72 normally lying against the gate 52 to hold it in closed position. In such position of the finger 68, the shank 70 will be arranged at an angle to the vertical and horizontal, and since the fingers 62 are resilient, they exert a force against the edges of the shank 70 adjacent the finger 68 to tend to turn this member counterclockwise to maintain it in pressure engagement with the gate 50. If a bin or other receptacle, or the discharge spout itself becomes full while the conveyor is in opeartion, material can no longer flow through the opening 20. The action of the conveyor will then build up a pressure within the unit 22, and this pressure acts against the gate 52 and against the finger 68 to swing this finger outwardly and downwardly. This causes an over-center turning movement of the shank 70, and this shank will now occupy the position shown in FIGURE 4, the shank extending downwardly away from the adjacent wall 40.

The resiliency of the fingers 62 will maintain the shank 70 in the position shown in FIGURE 4, fully releasing the gate 52 for the free escape of material from the unit 22. This relieves any back pressure opposing operation of the conveyor auger, and thus prevents damage to the conveyor or any of the driving parts connected thereto, thrown belts, sheared pins and the like.

The device is easily installed in position on any known type of auger conveyor. With the yoke 46 removed, the unit 22 is moved into engagement with the conveyor tube 12 as shown in FIGURE 1. Yoke 46 is then placed in position and the nuts 48 applied and tightened to clamp unit 22 in position.

The device is obviously automatic in operation. The gate 52 is held closed by the force of the spring fingers 62 during normal operation, and when an excessive pressure buildup occurs in the unit 22 or spout 23 for the reason given, the gate 52 is relieved of all force tending to maintain it closed, thus popping open and providing for the free escape of material from the unit 22. Thereafter, the operator, after clearing the stoppage, merely closes the gate and resets the over-center latch to restore normal operation.

What is claimed is:

1. For use with an inclined auger conveyor having a conveyor tube provided with a discharge opening near its otherwise closed upper end, a discharge spout unit adapted to be fixed to the conveyor tube to receive material therefrom for downward discharge into a receptacle or the like, said discharge spout unit being provided with a side wall having a relief-discharge opening, a gate arranged outwardly of said wall and having an upper end hinged thereto whereby the lower end of said gate is adapted to swing outwardly, and means normally holding said gate in closed position and releasable by pressure within said unit to allow said gate to swing freely outwardly for the discharge of material from within said unit to relieve pressure therein.

2. An apparatus according to claim 1 wherein said means for holding said gate in closed position comprises an over-center spring device normally holding said gate closed and adapted to swing wholly out of engagement with said gate under the influence of pressure in said outlet unit to fully release said gate for free swinging movement.

3. An apparatus according to claim 1 wherein said last named means comprises a finger engaging said gate near the bottom thereof, and over-center resilient means tending to maintain said finger in pressure engagement with said gate.

4. An apparatus according to claim 3 wherein said resilient means comprises another pair of fingers, said first-named finger having a shank angularly arranged between said pair of fingers and said wall whereby the resilient force of said fingers urges said first-named finger into engagement with said gate, pressure against the inner face of the latter through said relief-discharge opening forcing said first-named finger outwardly to turn said shank past an over-center position whereby said pair of fingers urges said first-named finger away from said gate to freely release the latter.

5. In combiantion with an inclined auger conveyor having a tube and auger conveying mechanism therein for moving material upwardly through said tube, said tube being provided in its under surface with a discharge opening, an open-topped discharge spout unit fitting around the under portion of said tube at said discharge opening to receive material from said tube for downward discharge into a receptacle or the like, means for clamping said discharge unit to said tube, said discharge unit having a wall provided with a lateral opening near its connection to said tube, a gate normally closing said lateral opening, and pressure-responsive spring means normally holding said gate in closed position and operable to release said gate under the influence of excessive pressure in the material in said unit, for permitting material to flow through said lateral opening.

6. The combination defined in claim 5 wherein said pressure-responsive means comprises an over-center spring device normally holding said gate closed and movable over-center by the pressure of material in said unit to fully release said gate for free movement to allow for the flow of material from said unit.

7. The combination defined in claim 6 wherein said gate is pivotally connected at its top to said wall, said over-center device comprising a finger engaging the outer face of said gate near the bottom thereof, and resilient means normally transmitting a force to said finger to maintain it against said gate to keep the latter closed, excess pressure of material from within said unit swinging the lower end of said gate outwardly to swing said finger to an over-center position fully releasing said gate for the free flow of material through said lateral opening.

8. The combination defined in claim 7 wherein said finger is provided with a shank extending beyond opposite edges thereof, and said resilient means comprises resilient fingers engaging opposite ends of said shank, said shank having an edge opposite said resilient fingers engaging said wall and normally occupying an angular position in which the force of said pair of resilient fingers against said shank maintains engagement of said first-named finger with said gate, movement of said gate by excessive pressure in said discharge unit swinging said first-named finger and said shank to reverse the angular position of the latter, whereby the resilient force of said resilient fingers snaps said first-named finger away from said gate to fully release it for the free swinging of said gate to release material under pressure from said discharge unit.

References Cited

UNITED STATES PATENTS 2,452,395  10/1948  Schelling _____ 198—232 X
2,853,181   9/1958  Lillehaugen _____ 198—232

EDWARD A. SROKA, *Primary Examiner.*